B. M. Parks,
Churn-Dasher.

No. 75,963. Patented Mar 24. 1868.

Witnesses:
H. Pauli
J. Beschestofill

Inventor:
B. M. Parks
By his Atty
M. Randolph

United States Patent Office.

BENJAMIN M. PARKS, OF ST. LOUIS, MISSOURI.

Letters Patent No. 75,963, dated March 24, 1868.

IMPROVEMENT IN CHURN-DASHER.

*The Schedule referred to in these Letters Patent and making part of the same.*

TO ALL WHOM IT MAY CONCERN:

Be it known that I, BENJAMIN M. PARKS, of St. Louis, in the county of St. Louis, and State of Missouri, have made certain new and useful Improvements in Churn-Dashers; and I do hereby declare that the following is a full and clear description thereof, reference being had to the accompanying drawings, and to the letters of reference marked thereon.

The object of this invention is to construct a churn-dasher in such a manner as to introduce a large amount of atmospheric air into the milk that is being churned, and at the same time to so arrange the flanges of the dasher as to agitate the milk in a very violent manner. To accomplish this result, I employ a hollow or tubular handle for the dasher, and place an air-valve at the bottom end of the said tube. There are double dashers to be used in connection with this tubular handle. The object in placing the valve at the bottom of the tube, instead of at the top, as it is in most other dashers having valves, is to bring the valve directly into contact with the milk in the churn, instead of allowing the milk to pass up into the dasher-handle at every stroke of the same, as it otherwise would do, thereby impeding the churning-operation by preventing the flow of air through the dasher.

To enable those skilled in the art to make and use my improved churn-dasher, I will proceed to describe its construction and operation.

Figure 1:
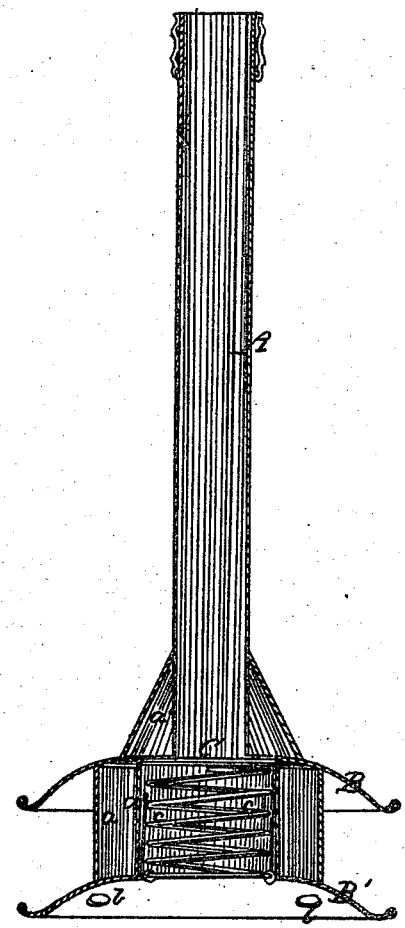

Figure 1 of the drawings is a sectional elevation of one of the improved dashers.

Figure 2:
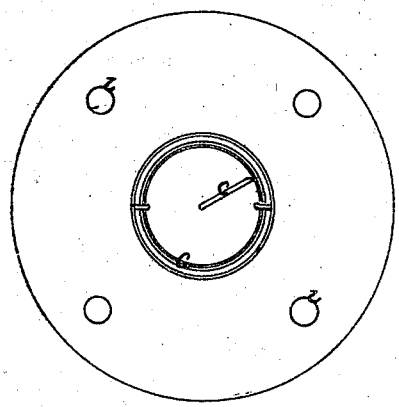

Figure 2 is a bottom plan of the same.

The handle A is to be made hollow, and it may be made of wood or metal, but I prefer sheet metal, as being lighter and better adapted to the purpose. To the bottom end of this handle are to be secured two disks or dashers, B B'. These dashers are to be dish-shaped, and perforated with holes, $b$, for the better agitation of the milk-globules. The lower disk B' is to be secured to the handle, at or near its bottom end, and the disk B a short distance, say one or two inches, above it. These disks may be strengthened in their connection with each other, and with the handle, by means of the cylindrical piece $a$ and the conical brace $a'$. A valve, C, is to be placed in the bottom end of the tube A, and arranged to open downward, so as to admit air into the milk from above, but to close so as to prevent the milk from flowing up into the tube. A spring, $c$, below the valve, forces it home upon its seat, which is in an enlarged chamber, in the bottom end of the tube, the said chamber being formed by the enlarged annular well, $a^2$, which forms the bottom end of the tube A. By placing the valve C at the bottom of the tube, and combining therewith two dashers, B B', the milk will be churned very quickly, and its butter very thoroughly extracted.

Having described my invention, what I claim, is—

The handle A, when combined with the two dashers B B' and the valve C, as described and shown.

In testimony of which invention I hereunto set my hand, in presence of—

BENJ. M. PARKS.

Witnesses:
M. RANDOLPH,
H. PAULI.